United States Patent
Burba et al.

(10) Patent No.: US 9,258,353 B2
(45) Date of Patent: Feb. 9, 2016

(54) MULTIPLE BUFFERING ORDERS FOR DIGITAL CONTENT ITEM

(71) Applicant: MICROSOFT TECHNOLOGY LICENSING, LLC, Redmond, WA (US)

(72) Inventors: Alexander Burba, Seattle, WA (US); Frank R. Morrison, III, Seattle, WA (US); Mehmet Akkurt, Seattle, WA (US); Brandon Hunt, Redmond, WA (US); John Justice, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 13/658,753

(22) Filed: Oct. 23, 2012

(65) Prior Publication Data

US 2014/0115157 A1     Apr. 24, 2014

(51) Int. Cl.
*H04L 29/08* (2006.01)
*G06F 17/30* (2006.01)

(52) U.S. Cl.
CPC .......... *H04L 67/06* (2013.01); *G06F 17/30902* (2013.01); *H04L 67/22* (2013.01); *H04L 67/306* (2013.01); *H04L 67/322* (2013.01)

(58) Field of Classification Search
CPC ............................... H04L 67/00; G06F 17/00
See application file for complete search history.

(56) References Cited

U.S. PATENT DOCUMENTS

| | | |
|---|---|---|
| 5,754,938 A | 5/1998 | Herz et al. |
| 6,085,226 A | 7/2000 | Horvitz |
| 6,106,395 A | 8/2000 | Begis |
| 6,400,381 B1 | 6/2002 | Barrett et al. |
| 6,645,068 B1 | 11/2003 | Kelly et al. |

(Continued)

FOREIGN PATENT DOCUMENTS

| | | |
|---|---|---|
| EP | 1244016 A1 | 9/2002 |
| EP | 2264624 A1 | 12/2010 |

OTHER PUBLICATIONS

Chen, et al., "User Identification based on Game-Play Activity Patterns", Retrieved at <<http://www.iis.sinica.edu.tw/~swc/pub/gamer_identification.html>>, Academia Sinica, Retrieved Date : Jul. 4, 2012, 15 Pages.

(Continued)

*Primary Examiner* — Ebrahim Golabbakhsh
(74) *Attorney, Agent, or Firm* — Aaron Chatterjee; Judy Yee; Micky Minhas

(57) ABSTRACT

Various embodiments are disclosed that relate to buffering digital content items in different orders for different user experiences. For example, one disclosed embodiment provides, on a computing device, a method for providing a buffering order for a digital content item. The method includes receiving from a remote computing device a request to access a selected digital content item, the selected digital content item comprising a plurality of content portions consumable in a plurality of different orders, the plurality of different orders corresponding to a plurality of user experiences for the selected digital content item, and in response, providing a selected content provision schema selected from a plurality of content provision schemas for the selected digital content item, each content provision schema defining a buffering order of the plurality of content portions of the selected digital content item for a corresponding user experience of the selected digital content item.

20 Claims, 4 Drawing Sheets

(56) References Cited

U.S. PATENT DOCUMENTS

| | | | |
|---|---|---|---|
| 7,325,106 B1 | 1/2008 | Dmitriev et al. | |
| 7,614,955 B2 | 11/2009 | Farnham et al. | |
| 8,118,678 B2 | 2/2012 | Jennings et al. | |
| 8,243,562 B2 | 8/2012 | Yoo et al. | |
| 8,298,087 B1 | 10/2012 | Smith | |
| 8,554,640 B1 | 10/2013 | Dykstra et al. | |
| 2001/0044850 A1 | 11/2001 | Raz et al. | |
| 2002/0142815 A1 | 10/2002 | Candelore | |
| 2005/0234864 A1 | 10/2005 | Shapiro | |
| 2005/0273772 A1* | 12/2005 | Matsakis et al. | 717/136 |
| 2006/0047804 A1 | 3/2006 | Fredricksen et al. | |
| 2007/0005646 A1 | 1/2007 | Dumais et al. | |
| 2007/0041383 A1* | 2/2007 | Banikazemi et al. | 370/395.3 |
| 2007/0072678 A1 | 3/2007 | Dagres | |
| 2007/0173324 A1 | 7/2007 | Multerer et al. | |
| 2007/0266311 A1 | 11/2007 | Westphal | |
| 2008/0039204 A1 | 2/2008 | Ackley et al. | |
| 2008/0301254 A1* | 12/2008 | Bestler | 709/212 |
| 2009/0048977 A1 | 2/2009 | Aggarwal et al. | |
| 2009/0138907 A1 | 5/2009 | Wiser et al. | |
| 2009/0264202 A1 | 10/2009 | Chen et al. | |
| 2010/0023338 A1 | 1/2010 | Petronelli et al. | |
| 2010/0035689 A1 | 2/2010 | Altshuler et al. | |
| 2010/0058377 A1 | 3/2010 | Grob et al. | |
| 2010/0115123 A1* | 5/2010 | Airamo | 709/234 |
| 2010/0131443 A1 | 5/2010 | Agarwal et al. | |
| 2010/0262487 A1 | 10/2010 | Edwards et al. | |
| 2010/0293566 A1 | 11/2010 | Valdez | |
| 2010/0332329 A1 | 12/2010 | Roberts et al. | |
| 2011/0119313 A1 | 5/2011 | Sung et al. | |
| 2011/0126102 A1 | 5/2011 | Archer | |
| 2011/0153612 A1 | 6/2011 | Paul et al. | |
| 2011/0289534 A1 | 11/2011 | Jordan et al. | |
| 2011/0307599 A1 | 12/2011 | Saretto et al. | |
| 2012/0005316 A1 | 1/2012 | Perry et al. | |
| 2012/0096289 A1 | 4/2012 | Kawakami et al. | |
| 2012/0134291 A1 | 5/2012 | Raleigh | |
| 2012/0142429 A1 | 6/2012 | Muller | |
| 2012/0254246 A1 | 10/2012 | Kerger et al. | |
| 2013/0045710 A1 | 2/2013 | Raleigh | |
| 2013/0110854 A1 | 5/2013 | Lockhart et al. | |
| 2014/0033081 A1 | 1/2014 | Fernandez et al. | |

OTHER PUBLICATIONS

Gastin, et al., "Distributed games and distributed control for asynchronous systems", Retrieved at <<http://www.labri.fr/perso/zeitoun/recherche/articles/confs/04-LATIN/LATIN-04.pdf>>, In Proc. of Latin American Theoretical Informatics (Latin'04), Apr. 2004, 19 Pages.

Burba, Alexander et al., "Buffer Ordering Based on Content Access Tracking" U.S. Appl. No. 13/658,746, filed Oct. 23, 2012, 30 pages.

Yun, et al., "PADS: Enhancing Gaming Experience Using Profile-Based Adaptive Difficulty System", Retrieved at <<http://citeseerx.ist.psu.edu/viewdoc/download?doi=10.1.1.192.1158&rep=rep1&type=pdf>>, PADS: Enhancing Gaming Experience Using Profile-Based Adaptive Difficulty System , Jul. 28, 2010, pp. 5.

ISA European Patent Office, International Search Report & Written Opinion for PCT Application No. PCT/US2013/066218, Jan. 20, 2014, 11 pages.

ISA European Patent Office, International Search Report & Written Opinion for PCT Application No. PCT/US2013/066211, Jan. 27, 2014, 8 pages.

ISA European Patent Office, International Search Report and Written Opinion issued in Application No. PCT/US2013/066209, Jan. 27, 2014, Netherlands, 8 pages.

* cited by examiner

MULTIPLE BUFFERING ORDERS FOR DIGITAL CONTENT ITEM

BACKGROUND

A digital content item, such as a video game, may comprise a large amount of data, and therefore may take a potentially significant amount of time to download in full. To help prevent long waiting times, some digital content items may allow a user to begin interacting with the content before downloading is complete. However, a user consuming the content may experience delays during play as the user reaches portions of the content that have not yet been downloaded.

SUMMARY

Various embodiments are disclosed that relate to buffering portions of a digital content item in different orders for different user experiences. For example, one disclosed embodiment provides, on a computing device, a method for providing a buffering order for a digital content item. The method includes receiving from a remote computing device a request to access a selected digital content item, the selected digital content item comprising a plurality of content portions consumable in a plurality of different orders, the plurality of different orders corresponding to a plurality of user experiences for the selected digital content item, and in response, providing a selected content provision schema selected from a plurality of content provision schemas for the selected digital content item, each content provision schema defining a buffering order of the plurality of content portions of the selected digital content item for a corresponding user experience of the selected digital content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a digital content item, such as a downloadable content item, may be configured to allow a user to begin interacting with the content item before downloading is complete. However, users may experience delays if the user reaches a portion of the content item during play that has not yet been received. As a content item such as a video game may comprise a plurality of user experiences (e.g., different game play modes, various possible paths through a large game, etc.), different users may consume the game in different manners during downloading, and thus also may experience different delays.

As such, providing for the ability to intelligently access portions of a digital content item in an order selected based upon a user experience requested, or a user experience determined to be likely to be desired, may help to reduce delays and interruptions in the user experience. It will be understood that the terms "content portion" and the like denote any portion of data of the digital content item, and may or may not correspond to a discrete feature, file, object, etc. of the digital content item. Likewise, the terms "buffering order" and the like may refer to an order in which portions of a digital content item are to be obtained by a receiving computing device.

Even when using a buffering order corresponding to a particular user experience selected by a user, a computing device with which the user is experiencing the interactive digital content item may access content portions "out of order," depending upon how the user progresses through the content item. As such, in some embodiments, buffering orders corresponding to particular user experiences may be updated over time by tracking temporal information regarding how users access the portions of one or more interactive digital content items. This temporal information may be referred to herein as "content access information," and the order in which a user actually accessed the portions of the content item may be referred to herein as a "content access pattern" for the content item.

Figure 1:
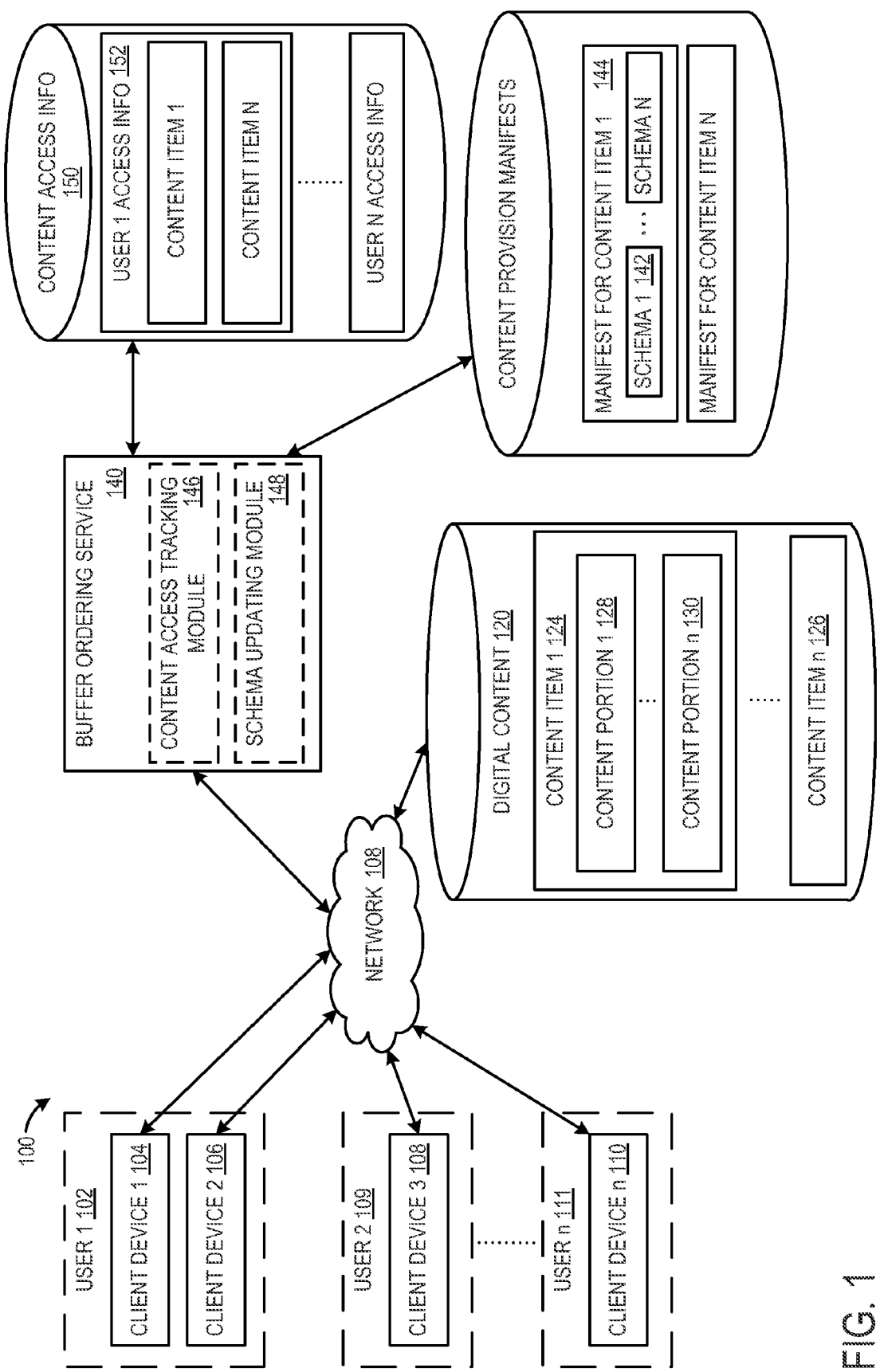
FIG. 1 schematically illustrates an example embodiment of a use environment for providing and consuming digital content.

Prior to discussing these embodiments in more detail, an example embodiment of a use environment 100 is described with reference to FIG. 1. Use environment 100 comprises a plurality of client devices each configured to receive and present digital content, wherein each client device may be associated with a corresponding user. In some instances, more than one client device may be associated with a user. For example, a user may have two or more of a video game console, a mobile device, a computer (laptop, desktop, tablet), a wearable device (e.g. head-mounted display), etc., and may consume digital content on each of these devices. This is shown in FIG. 1 as a first user 102 having a first associated client device 104 (e.g. video game console) and a second associated client device 106 (e.g. mobile device, wearable device, portable device, computer, etc.). FIG. 1 also shows two other client devices associated with other users as client device 3 108 associated with user 2, and client device n 110 associated with user n 111 to illustrate the multi-user nature of use environment 100. While described in the context of a client-server environment, it will be understood that other embodiments may utilize any other suitable architecture, including but not limited to peer-to-peer configurations.

Each client device is in communication with one or more digital content stores 120 (e.g. locations from which media content may be downloaded) via a network 122 (e.g. computer network, cellular phone network, and/or any other suitable type of network). Digital content store 120 is depicted as storing a plurality of digital content items, illustrated as digital content item 1 124 and digital content item n 126. Each client device also may be in communication with one or more other client devices for receiving content from peer devices.

Each digital content item comprises a plurality of content portions, examples of which are shown as content portion 1 128 and content portion n 130 for digital content item 1 124. Digital content items 124, 126 may represent any suitable type of digital content, including but not limited to interactive content such as video games, interactive video, and social media. Other examples include, but are not limited to, movies, television shows and other videos, music, photographs, websites, etc. Likewise, content portions 128, 130 may take any suitable form. For example, content portions 128, 130 may take the form of specific portions of memory (e.g. memory locations, disk sectors, etc.), or, by extension, specific files, etc.

Environment 100 also comprises a buffer ordering service 140 that determines a buffering order in which client devices obtain portions of digital content items requested by the users of the client devices. As described above, buffer ordering service 140 may determine a buffering order for a digital content item based upon a user experience desired, or determined to be likely to be desired, by the requesting user. Buffer ordering service 140 may determine the buffering order for portions of a requested digital content item based upon any suitable factor or factors. Examples include, but are not limited to, an explicit request for a particular user experience (e.g. a particular activity/character/experience within a multi-activity video game), an initial content access pattern of a user consuming the requested digital content item (e.g. how a user starts to play a video game), past content access patterns of the user (e.g. to see how the user played similar video games, and/or to locate other similar users with potentially similar "styles" of interacting with content to see how they played the requested game), and/or based upon any other suitable information.

The buffering orders may be determined in any suitable manner. For example, in the depicted embodiment, the buffering orders for a content item are provided via content provision schemas 142, wherein each content provision schema 142 defines a buffering order for the associated digital content item. FIG. 1 depicts an arbitrary number n content provision schemas for item 1 to illustrate that any suitable number of content provision schemas may be provided for a digital content item. In the depicted embodiment, the content provision schemas for a content item are stored in a content provision manifest 144 for that content item, such that the manifest for a content item may be obtained to determine the available buffering orders for that content item. However, it will be understood that the content provision schemas 142 may be stored in any other suitable data structure in other embodiments.

The buffering orders defined by content provision schemas 142 may be determined in any suitable manner. For example, in some embodiments, content provision schemas 142 may be provided by a developer/publisher of the digital content item. In such cases, the buffering orders defined by content provision schemas 142 may be determined, for example, via a console profiling tool and/or via game play test monitoring (e.g., "beta testing") during the content development process. In other embodiments, content provision schemas 142 may be determined by monitoring content access patterns of early users of a digital content item to match experiences selected by the early users with content access patterns utilized to provide those experiences.

Buffer ordering service 140 thus may further comprise a content access tracking module 146 configured to track temporal information regarding the accessing of portions of the digital content items of digital content access store 120 by the client computing devices. Buffer ordering service 140 also may comprise a schema updating module 148 configured to analyze the content access information and update the content provision schemas based upon the analysis. This may allow content access information of earlier users to be used to determine and/or refine buffering orders associated with user experiences for use by later users.

Further, in some embodiments, content access information for a digital content item may be used to determine a buffering order for a related digital content item. For example, if a selected user does not explicitly request a desired user experience for a selected digital content item, content access information for the user may be compared to content access information for other users to identify similar users, and then a buffering order used by one or more similar other users of the selected digital content item may be provided to the selected user.

Content access information tracked by content access tracking module 146 may be stored in a content access information store 150. Content access information store 150 may store content access information 152 for each of a plurality of users, illustrated as information for an arbitrary number N of users, and for each digital content item accessed by each user, illustrated as content access information for an arbitrary number N of digital content items for user 1. The stored content access information may include any suitable information, including but not limited to an order in which portions of each digital content item were accessed by users. Content access information may be provided to the buffer ordering service 140 by client devices as users download and consume digital content on the client devices (or at a later time after downloading), by a digital content provision service that provides digital content to clients, and/or from any other suitable source.

Figures 2, 3:
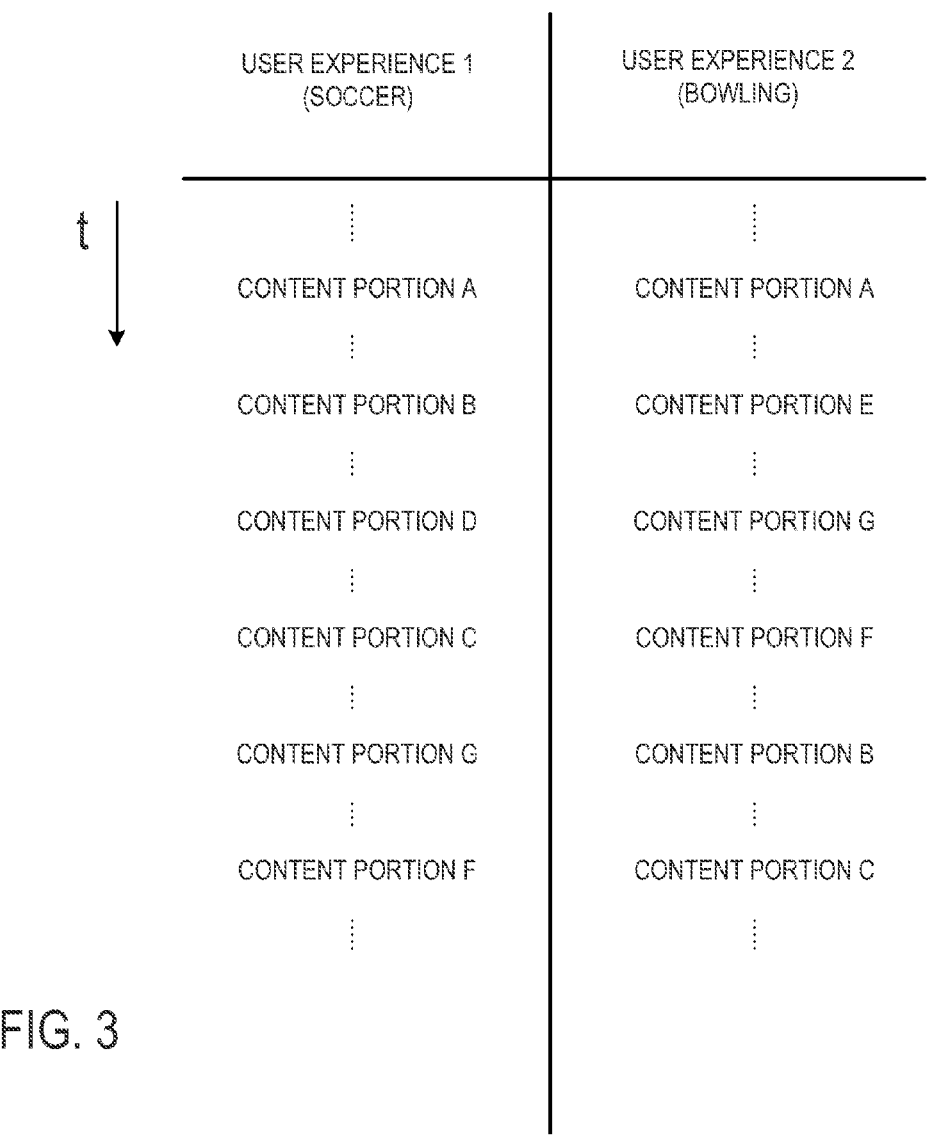
FIG. 2 illustrates a schematic depiction of an example content provision manifest according to an embodiment of the present disclosure.
FIG. 3 schematically illustrates two example buffering orders for a digital content item.

FIG. 2 schematically illustrates an example content provision manifest 200 for a digital content item in the form of a multi-sport video game. Manifest 200 includes a plurality of content provision schemas 204 each defining an order in which to provide portions of the digital content item. As illustrated, the example manifest 200 includes schema 206 for providing a volleyball game first, schema 208 for providing a soccer game first, schema 210 for providing a boxing game first, and schema 212 for providing a bowling game first.

As an example scenario, when requesting to access the sports game (e.g. purchasing access to the game), a user may be presented with a menu of sports activities within the sports game. Upon selection of a specific sport, such as soccer, portions of the game are provided to the user's computing device in the order specified by the soccer content provision schema 208, such that soccer-related content portions are provided to the user before content portions that are not used by the soccer experience. Further, the soccer content provision schema 208 also may specify the order in which content portions other than soccer-related portions are provided. For example, it may be known or determined that users that play the soccer experience first tend to play other team sports after playing soccer. Thus, the soccer schema 208 may specify that volleyball-related portions are to be downloaded after the soccer portions and before the boxing or bowling portions. Similarly, in the example of an adventure game having a large world, a user may be presented with one or more questions, game options, etc., and user responses may provide hints for determining which content provision schema to select. It will be understood that these scenarios are presented for the purpose of example, and are not intended to be limiting in any manner, as any other suitable type of user experience may have an associated buffering order. Other examples include, but are not limited to, particular teams for different sports, particular characters for multi-character games, particular cars for multi-car racing games, open world games with many different possible directions, etc.

Content provision manifest 200 may include any suitable information in addition to the content provision schemas 204. For example, content provision manifest 200 may include identifying information, such as content ID 214 that identifies the digital content item with which the manifest is to be used. Content provision manifest 200 further may include metadata 216 describing the schemas within the manifest. This may help the buffering order module to select a content provision schema in light of a user experience to be provided.

FIG. 3 schematically illustrates example buffering orders 302 and 304 for a first user experience of the multi-sports game, shown as a soccer game, and a second user experience, shown as a bowling game. Order 302 may correspond to a user experience provided by schema 208 of FIG. 2, and order 304 may correspond to a user experience provided by schema 212 of FIG. 2. A relative buffering order for each user experience is illustrated on a vertical time axis, and shows that portions of the digital content other than portion A are provided in different orders for the two user experiences. Portion A may correspond to, for example, a virtual character common to both user experiences, while the other portions may correspond to particular games to be played (e.g. portions B, D and C are for soccer, while portions E, F and G are for bowling). It will be understood that the embodiment of FIG. 3 is presented for the purpose of example, and is not intended to be limiting in any manner.

Figure 4:
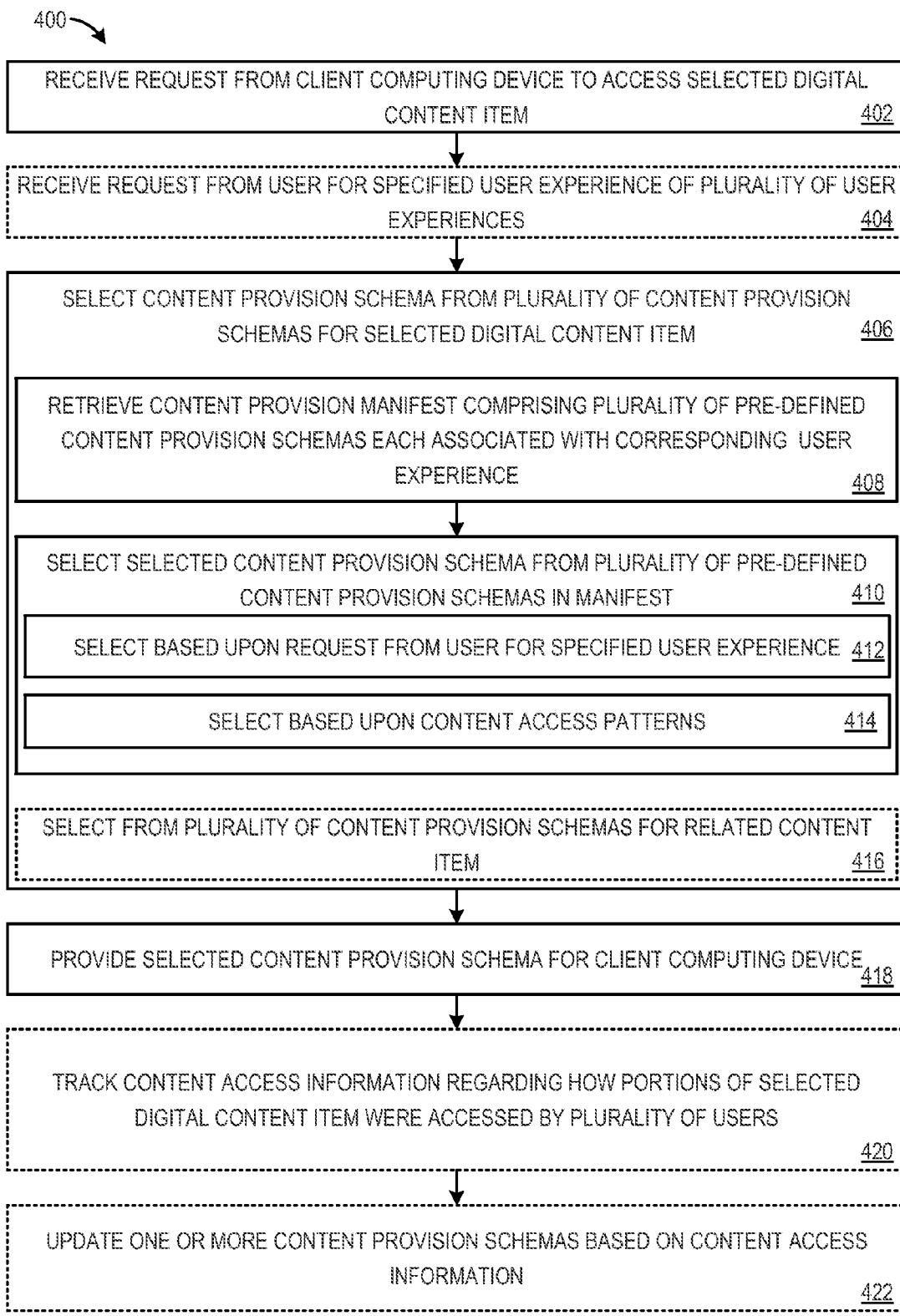
FIG. 4 illustrates a flow diagram depicting an embodiment of a method for providing a buffering order for accessing digital content.

FIG. 4 shows a flow diagram depicting an embodiment of a method 400 for providing digital content. At 402, method 400 comprises receiving a request from a client computing device to access a selected digital content item. As previously described, the selected digital content item comprises a plurality of content portions consumable in a plurality of different orders, where the plurality of different orders correspond to a plurality of user experiences for the selected digital content item.

In some instances, a user may specify a desired user experience. As such, method 400 may comprise receiving a request from the user for a specified user experience of the plurality of user experiences, as indicated at 404. This request may be received concurrently with the download request, or after the download request via a separate communication. In other instances, the user may request to download the digital content item without specifying a particular user experience, as described in more detail below.

At 406, method 400 comprises selecting a selected content provision schema from a plurality of content provision schemas for the selected digital content item, wherein each content provision schema defines a buffering order of portions of the selected digital content item for a corresponding user experience. Selecting the content provision schema may include any suitable processes. For example, as indicated at 408, in some embodiments selecting the content provision schema may include retrieving a content provision manifest (e.g., manifest 200 of FIG. 2) comprising a plurality of pre-defined content provision schemas each associated with a particular user experience of the digital content item, and then selecting an appropriate schema via the manifest.

Upon retrieving the content provision manifest, method 400 comprises, at 410, selecting the selected content provision schema from the plurality of pre-defined content provision schemas in the content provision manifest. The content provision schema may be selected from the manifest based upon any suitable information. For example, in some embodiments the content provision schema may be selected based upon an explicit request for the specified user experience, as indicated at 412, or upon content access patterns of the user and/or other users, as indicated at 414.

Content access patterns may be used in any suitable manner to help select a content provision schema. For example, the content access patterns of the requesting user may be compared to those of other users to identify similar other users that have previously accessed the selected digital content item. Then, the schema or schemas utilized by those similar other users may be applied to the requesting user.

Likewise, the requesting user's content access patterns for related, previously downloaded content items may be analyzed, potentially in combination with descriptive metadata, to determine a content provision schema to utilize for the selected digital content item. As a more specific example, if the selected digital content item is a multi-sport video game, the content access patterns of the user (and/or those of other users similar with similar content access patterns as the current user) for other sports games, previous versions of the multi-sport video game, etc., may be utilized to determine via descriptive metadata for the previously accessed content that the user (and/or the other similar users) frequently plays soccer portion of multi-sport video games. Then, a soccer-related content provision schema may be selected for the selected digital content item.

In some instances, a digital content item may not have predefined content provision schemas. In some such instances, schemas for a related digital content item (e.g. an earlier or later version of the requested content item) may be utilized to determine a buffering order, as indicated at 416.

At 418, method 400 further comprises providing the selected content provision schema for the client computing device in the order specified by the selected content provision schema. For example, in some embodiments, the content provision schema may be sent to the client device for use by the client device in obtaining the digital content item. In other embodiments, the content provision schema may be used by a content provision service in providing the selected digital content item to the client device.

It will be understood that in some instances, a user may change experiences while the selected experience is being downloaded. In such instances, downloading may switch to a content provision schema for the new experience when a suitable location in the downloading process is reached.

As mentioned above, content access pattern information may be useful in updating content provision schema over time, and/or in identifying similar users to help select content provision schema for download requests. Thus, method 400 may further comprise, at 420, tracking content access information for a plurality of users, and at 422, updating one or more content provision schemas based upon content access information. The content access information may include information regarding an order in which the plurality of portions of the selected digital content item were accessed by each user of the plurality of users, and/or any other suitable information.

Updating a content provision schema based on the observed behavior may help to improve a performance of the content provisions schema for later users. Similarly, the collected information also may be usable to verify the "quality" of a given content provision schema, e.g. an accuracy of the schema compared to actual content access patterns observed. If a schema is determined to be of insufficient quality, it may be further refined and/or may be deleted altogether for the sake of an improved interactive experience, for example.

Figure 5:
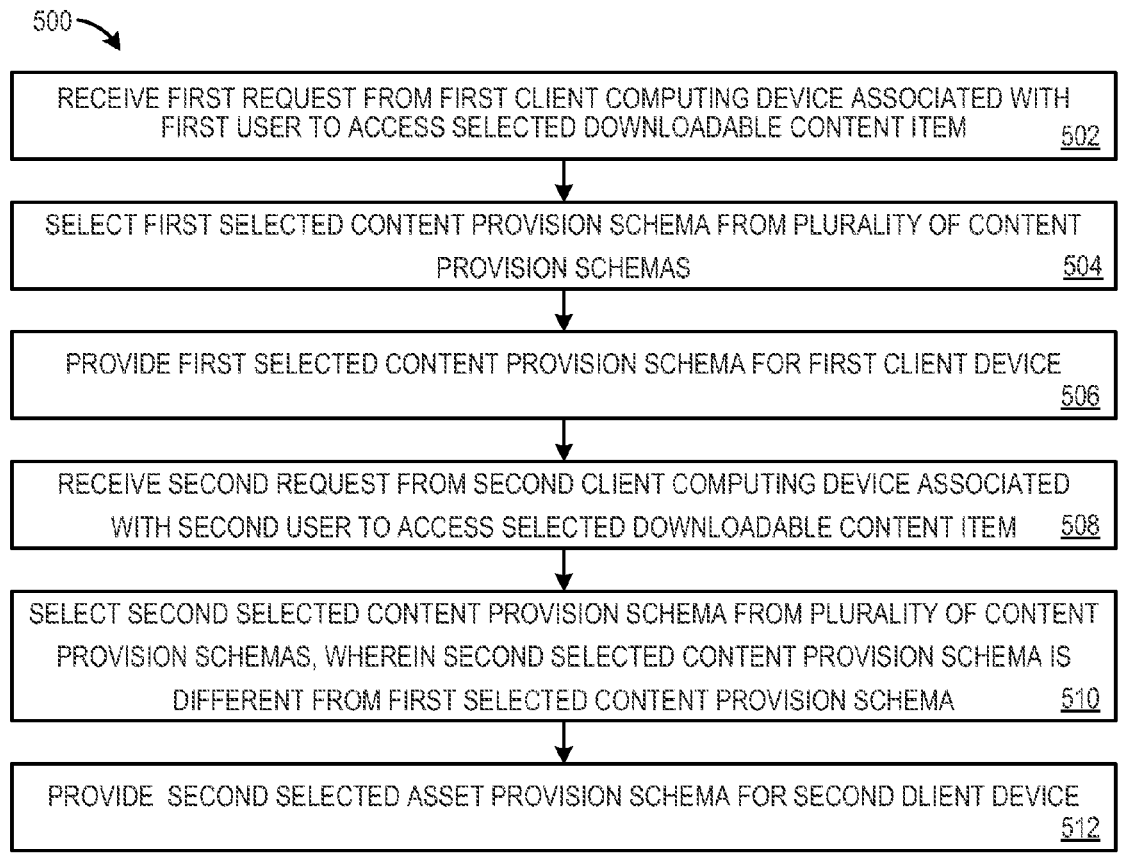
FIG. 5 illustrates a flow diagram depicting another embodiment of a method for providing a buffering order for accessing digital content.

The embodiments described above thus allow different users to access portions of a digital content item in different orders to enjoy different user experiences with potentially less start-up lag and/or less risk of disruption when playing the content during downloading. FIG. 5 shows a flow diagram depicting an embodiment of such a scenario. At 502, method 500 comprises receiving a first request from a first client computing device associated with a first user to access a selected digital content item (e.g. the user may request to download the selected digital content item). At 504, method 500 comprises selecting a first selected content provision schema from a plurality of content provision schemas for providing the portions of the selected digital content item to the requesting device, and, at 506, providing the first selected content provision schema for the client device. For example, the first selected content provision schema may be provided to the first client device, or provided to a content provision service for use in providing content to the first client device.

Method 500 further comprises receiving, at 508, a second request from a second client computing device associated with a second user to access the selected digital content item, and selecting, at 510, a second selected content provision schema from the plurality of content provision schemas, wherein the second selected content provision schema is different from the first selected content provision schema. This may occur, for example, where it is determined that the second user desires or is likely to desire a different user experience than the first user. Method 500 further comprises, at 512, providing the second selected content provision schema for the second client computing device.

In some embodiments, the methods and processes described above may be tied to a computing system of one or more computing devices. In particular, such methods and processes may be implemented as a computer-application program or service, an application-programming interface (API), a library, and/or other computer-program product.

Figure 6:
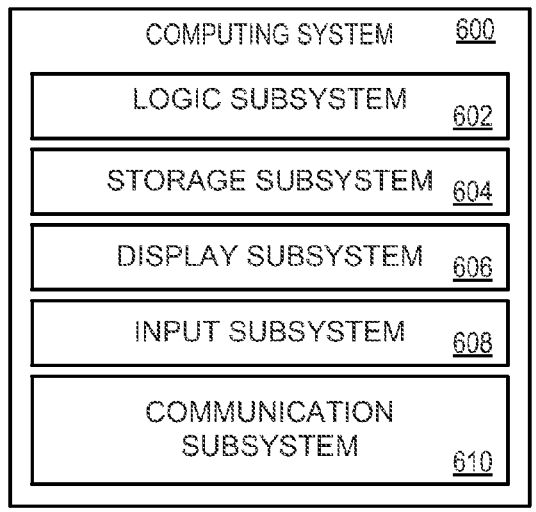
FIG. 6 illustrates an example embodiment of a computing system according to an embodiment of the present disclosure.

FIG. 6 schematically shows a non-limiting embodiment of a computing system 600 that can enact one or more of the methods and processes described above. Computing system 600 is shown in simplified form. Client computing devices 102, content service 106, content store 110, and content access info store 142 are non-limiting examples of computing system 600. It will be understood that any suitable computer architecture may be used without departing from the scope of this disclosure. In different embodiments, computing system 600 may take the form of a mainframe computer, server computer, desktop computer, laptop computer, tablet computer, home-entertainment computer, network computing device, gaming device, mobile computing device, mobile communication device (e.g., smart phone), etc.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 604 includes one or more physical, non-transitory, devices configured to hold data and/or instructions executable by the logic subsystem to implement the methods and processes described herein. When such methods and processes are implemented, the state of storage subsystem 604 may be transformed—e.g., to hold different data.

Storage subsystem 604 may include removable media and/or built-in devices. Storage subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 602 and of storage subsystem 604 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module" and/or "program" may be used to describe an aspect of computing system 600 implemented to perform a particular function. In some cases, a module and/or program may be instantiated via logic subsystem 602 executing instructions held by storage subsystem 604. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and/or program may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage subsystem, and thus transform the state of the storage subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed is:

1. On a computing device, a method of providing a buffer ordering for a digital content item, the method comprising:
   receiving from a remote computing device a request to access a selected digital content item, the selected digital content item being an executable interactive digital content item and comprising a plurality of content portions consumable in a plurality of different orders, the plurality of different orders corresponding to a plurality of user experiences for the selected digital content item; and
   in response, providing a selected content provision schema selected from a plurality of content provision schemas for the selected digital content item, each content provision schema defining a buffering order of memory locations of the plurality of content portions of the selected digital content item for a corresponding user experience of the selected digital content item.

2. The method of claim 1, further comprising:
   tracking content access information for plurality of users, the content access information comprising information regarding an order in which the plurality of content portions of the selected digital content item were accessed by each user of the plurality of users; and
   updating a respective buffering order of one or more content provision schemas of the plurality of content provision schemas based on the content access information.

3. The method of claim 1, wherein providing the selected content provision schema comprises selecting the selected content provision schema from a plurality of content provision schemas for the digital content item based upon content access patterns for one or more other digital content items.

4. The method of claim 3, wherein the content access information for the one or more other digital content items includes content access patterns for a user.

5. The method of claim 3, wherein the content access information for the one or more other digital content items includes content access patterns for other users.

6. The method of claim 3, wherein the one or more other digital content items are related to the selected digital content item by one or more of title and genre.

7. The method of claim 1, further comprising receiving a request from a user for a specified user experience of the plurality of user experiences, and providing the selected content provision schema based upon the request from the user for the specified user experience.

8. The method of claim 7, wherein providing the selected content provision schema comprises selecting the selected content provision schema from a plurality of content provision schemas for a related digital content item.

9. The method of claim 1, wherein providing the selected content provision schema comprises sending the selected content provision schema to the remote computing device.

10. The method of claim 9, wherein the content provision schemas are pre-defined based on one or more of a console profiling tool and game play test monitoring.

11. The method of claim 1, wherein the selected digital content item comprises a video game.

12. A computing system, comprising:
    a logic subsystem; and
    a storage subsystem comprising instructions stored thereon that are executable by the logic subsystem to:
       receive a request from a client computing device to download a selected digital content item, the selected digital content item being an executable interactive digital content item and comprising a plurality of content portions consumable in a plurality of different orders, the plurality of different orders corresponding to a plurality of user experiences for the selected digital content item; and
       provide for the client computing device a selected content provision schema from a plurality of content provision schemas for the selected digital content item, each content provision schema defining a buffering order of memory locations of the plurality of portions of the selected digital content item for a corresponding user experience of the selected digital content item.

13. The computing system of claim 12, wherein the instructions are further executable to:
    track content access information for one or more users, the content access information comprising information regarding how the plurality of portions of the selected digital content item were accessed by each user of one or more users; and update one or more content provision schemas of the plurality of content provision schemas based on the content access information.

14. The computing system of claim 12, wherein the instructions are executable to select the selected content provision schema based upon content access patterns for one or more other digital content items.

15. The computing system of claim 14, wherein the content access patterns for the one or more other digital content items includes one or more of content access patterns for a user and content access patterns for other users.

16. The computing system of claim 12, wherein the instructions are further executable to receive a request from a user for a specified user experience of the plurality of user experiences, and to select the selected content provision schema based on the request.

17. The computing system of claim 16, wherein the instructions are executable to select the selected content provision from a plurality of content provision schemas for a related digital content item.

18. The computing system of claim 12, wherein the instructions are executable to select the selected content provision schema by retrieving a content provision manifest comprising the plurality of content provision schemas, and selecting the selected content provision schema via the content provision manifest.

19. On a computing device, a method of providing digital content, the method comprising:
  receiving a first request from a first client computing device associated with a first user to access a selected digital content item, the selected digital content item being an executable interactive digital content item and comprising a plurality of content portions consumable in a plurality of different orders, the plurality of different orders corresponding to a plurality of user experiences for the selected digital content item;
  providing for the first client computing device a first content provision schema defining a first buffering order of memory locations of the plurality of content portions of the selected digital content item;
  receiving a second request from a second client computing device associated with a second user to access the selected digital content item; and
  providing for the second client device a second content provision schema defining a second, different buffering order of memory locations for the plurality of content portions of the selected digital content item.

20. The method of claim 19, wherein the first content provision schema and the second content provision schema are selected from a plurality of content provision schemas based on explicit user requests.

* * * * *